(12) United States Patent
Kwasny

(10) Patent No.: US 8,821,034 B2
(45) Date of Patent: Sep. 2, 2014

(54) MPO TYPE CONNECTOR WITH REDUCED OFF-CENTER LOADING

(75) Inventor: Joel D. Kwasny, Romeoville, IL (US)

(73) Assignee: Panduit Corp., Tinley Park, IL (US)

( * ) Notice: Subject to any disclaimer, the term of this patent is extended or adjusted under 35 U.S.C. 154(b) by 344 days.

(21) Appl. No.: 13/172,124

(22) Filed: Jun. 29, 2011

(65) Prior Publication Data

US 2012/0002926 A1    Jan. 5, 2012

Related U.S. Application Data

(60) Provisional application No. 61/360,240, filed on Jun. 30, 2010.

(51) Int. Cl.
*G02B 6/36* (2006.01)

(52) U.S. Cl.
USPC .......................................................... 385/78

(58) Field of Classification Search
None
See application file for complete search history.

(56) References Cited

U.S. PATENT DOCUMENTS

| | | | |
|---|---|---|---|
| 6,085,003 A | 7/2000 | Knight | |
| 6,439,778 B1 | 8/2002 | Cairns | |
| 7,077,576 B2 | 7/2006 | Luther et al. | |
| 7,540,666 B2 * | 6/2009 | Luther et al. | 385/59 |
| 2004/0117981 A1 | 6/2004 | Roth et al. | |
| 2005/0069264 A1 | 3/2005 | Luther et al. | |
| 2006/0239619 A1 * | 10/2006 | Luther et al. | 385/69 |
| 2007/0172172 A1 * | 7/2007 | Theuerkorn et al. | 385/53 |
| 2008/0089651 A1 * | 4/2008 | Lewallen et al. | 385/71 |
| 2008/0101751 A1 * | 5/2008 | Luther et al. | 385/59 |
| 2010/0310213 A1 * | 12/2010 | Lewallen et al. | 385/75 |

\* cited by examiner

*Primary Examiner* — Sung Pak
(74) *Attorney, Agent, or Firm* — Christopher S. Clancy; Christopher K. Marlow

(57) ABSTRACT

This application describes an MPO type connector with an internal assembly having a pin clamp, ferrule, and fiber array. The pin clamp that has a pair of contact surfaces abutting the ferrule. The contact surfaces are located along the mid-point of the height of the ferrule on either side of and proximate to the fiber array.

13 Claims, 11 Drawing Sheets

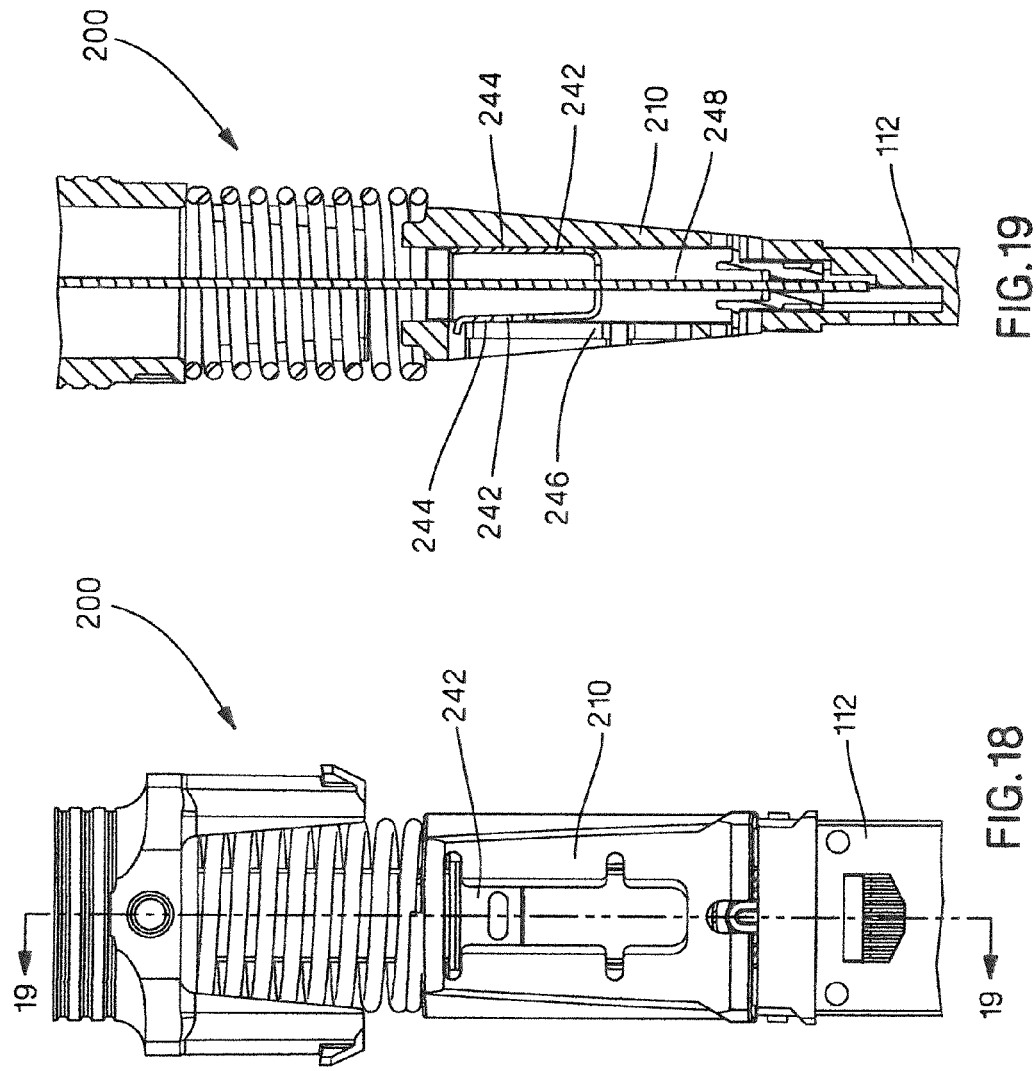

MPO TYPE CONNECTOR WITH REDUCED OFF-CENTER LOADING

CROSS-REFERENCE TO RELATED APPLICATION

This application claims priority to U.S. Provisional Application No. 61/360,240, filed Jun. 30, 2010, the subject matter of which is hereby incorporated by reference in its entirety.

FIELD OF THE INVENTION

The present invention relates generally to multifiber push on (MPO) type connectors and specifically to an internal assembly for an MPO type connector which directs the spring load on the ferrule closer to the longitudinal centerline of the connector.

BACKGROUND OF THE INVENTION

MPO type connectors are becoming increasingly popular due to demands for increased density and the development of high-speed multifiber (multilane) data transmission protocols. These demands are even causing MPO connectors with fiber counts greater than 12 to be manufactured. However, this increasing fiber count density makes MPO connectors even more susceptible to rocking effects created by off-center loading. Off-center loading creates uneven pressure on the ferrule end face, resulting in reduced physical contact and causing increased insertion loss and decreased return loss. Past solutions have generally included increasing the load to the ferrule applied by the spring; however, increasing the load per fiber to ensure a good physical contact is generally not desired because it causes high stress at the fiber tips and can cause fiber damage or fiber pistoning when applied over time.

SUMMARY OF THE INVENTION

This application describes an MPO type connector with an internal assembly having a pin clamp, ferrule, and fiber array. The pin clamp has a pair of contact surfaces abutting the ferrule. The contact surfaces are located along the mid-point of the height of the ferrule on either side of and proximate to the fiber array.

BRIEF DESCRIPTION OF FIGURES

FIG. 18 is a top view of a second embodiment of an internal assembly of an MPO type connector with reduced off-center loading that also features a retractable pin assembly.

FIG. 19 is a cross sectional side view of the internal assembly of FIG. 18.

DETAILED DESCRIPTION OF THE PREFERRED EMBODIMENTS

Figure 1:
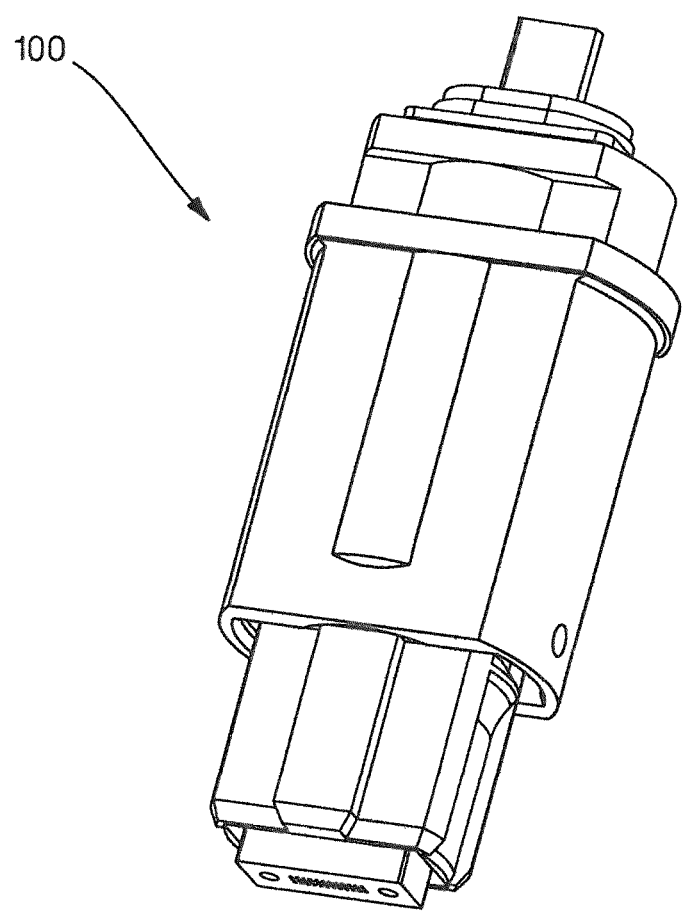
FIG. 1 is a perspective view of an MPO type connector with reduced off-center loading.
Figure 2:
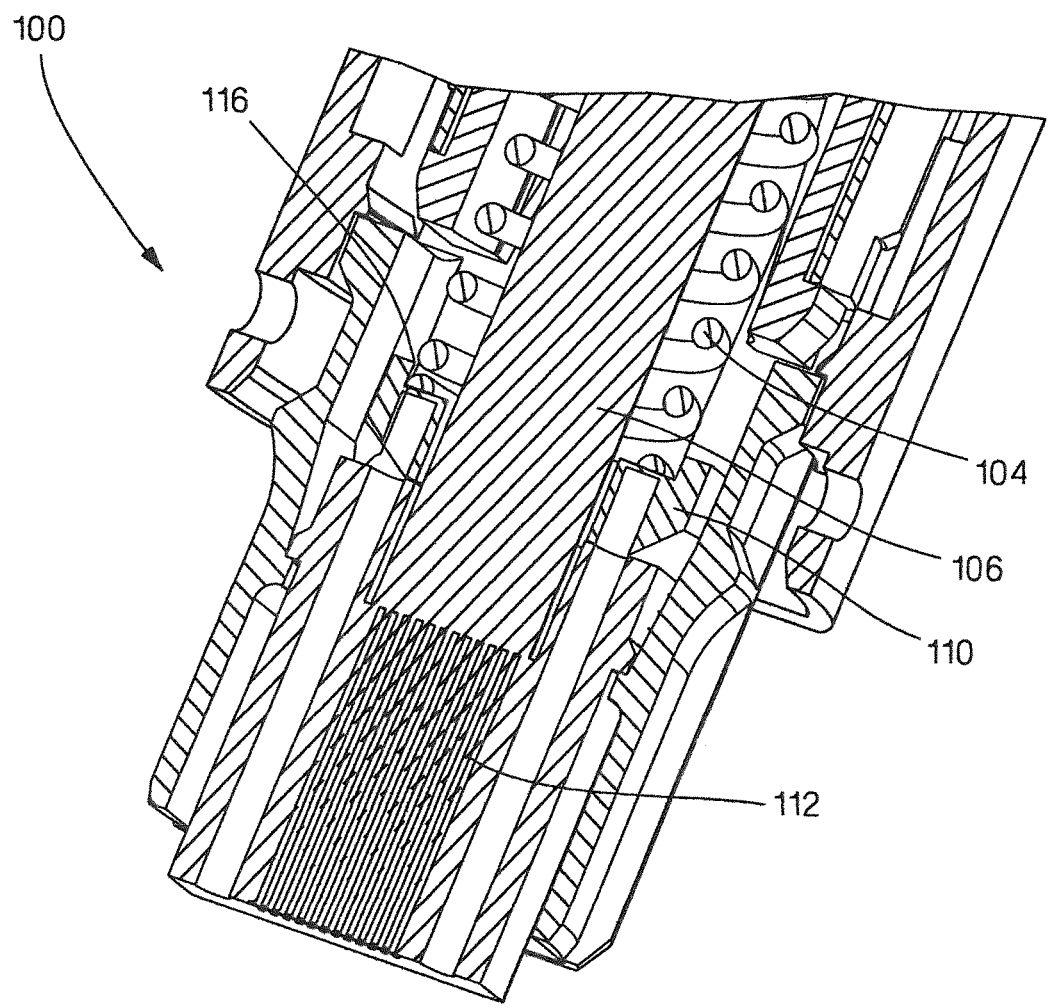
FIGS. 2 and 3 are perspective cut-away views of the connector of FIG. 1.
Figure 3:
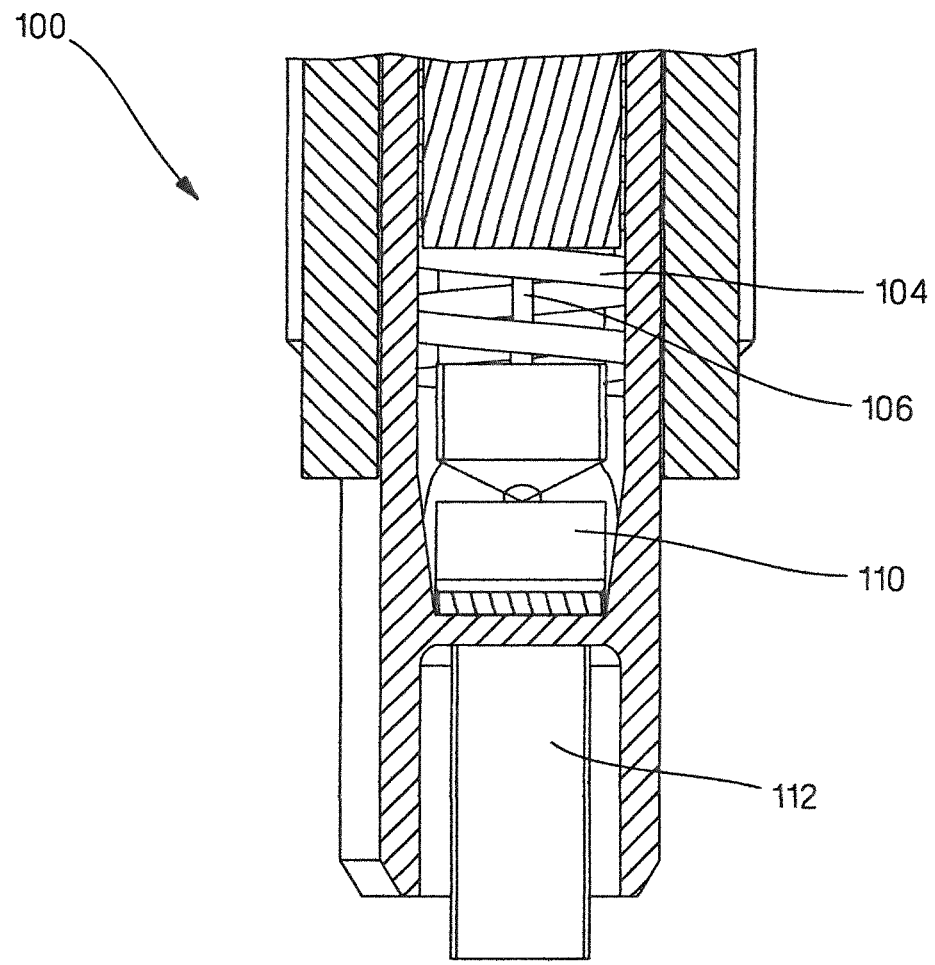
Figure 4:
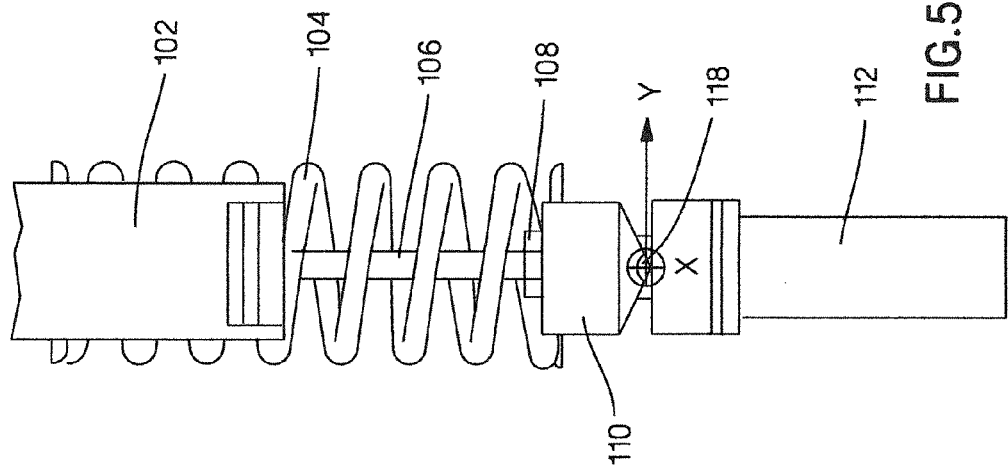
FIG. 4 is a top view of the internal assembly of the connector of FIG. 1.
Figure 5:
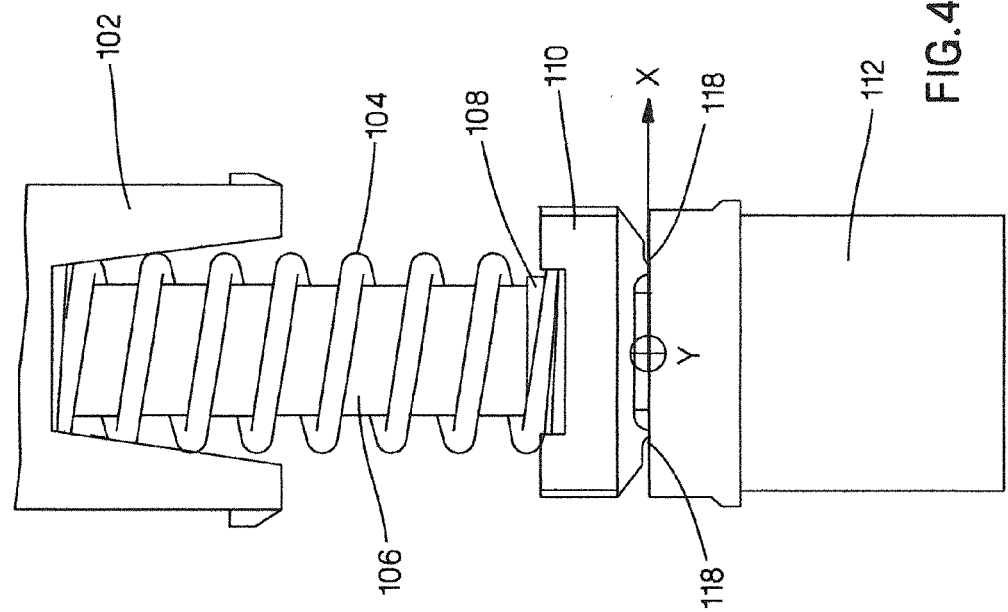
FIG. 5 is a side view of the internal assembly for the connector of FIG. 1.
Figure 6A:
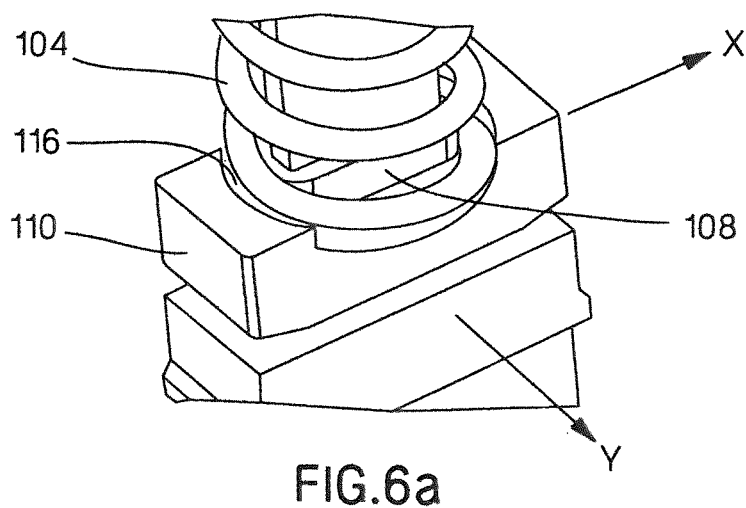
FIGS. 6a and 6b are perspective views of the internal assembly of the connector FIG. 1, focusing on the pin clamp.
Figure 6B:
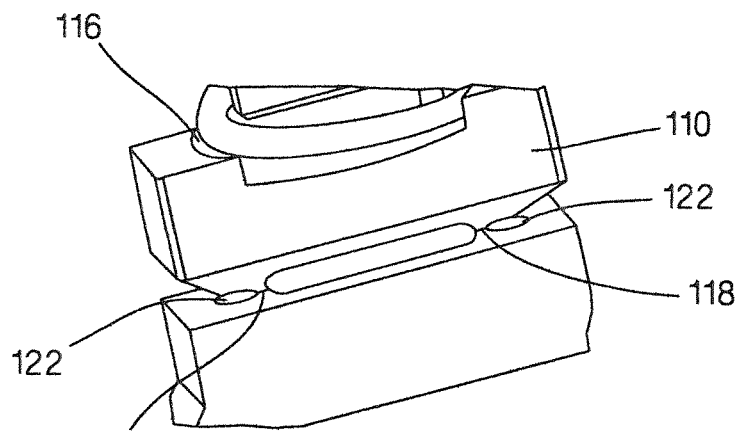

FIGS. 1-9 show an MPO connector 100 with reduced off-center loading. As shown in FIGS. 2-9, the internal assembly of the connector comprises a spring push 102 (shown in FIGS. 4 and 5), a spring 104, a fiber array 106, a ferrule boot 108, a pin clamp 110, a ferrule 112 (in one embodiment, the ferrule can be a standard FOCIS-5 compliant ferrule), and a plurality of polished fiber tips 114 (shown in FIG. 7). The fiber count can be from 1 to 72 or more fibers. The spring 104 can encircle the fiber array 106 and engage the spring push 102 at one end, and the pin clamp 110 at the other end. As highlighted in FIGS. 6a and 6b, the spring 104 sits in a spring clamp pocket 116 to centrally locate the contact surface about the center of the ferrule 112. The pin clamp 110 transfers the load from the spring 104 to the ferrule 112.

The pin clamp 110 contacts the back of the ferrule 112 via a pair of contact surfaces 118. The contact surfaces 118 are located along the mid-point of the height of the ferrule 112 (in FIGS. 4-9, the contact surfaces are along the x-axis, the x-axis being in the direction of the width of the ferrule and the y-axis being the direction of the height of the ferrule) and on either side of the fiber array 106 as close to the centerline of the width (as close to the y-axis) as allowed by the size of the fiber array 106. This design prevents any substantial off-center loading in the y-direction of the ferrule 112 and limits off-center loading in the x-direction. Alternatively, the contact surfaces can be extended such that contact is made with the ferrule outside of the alignment holes 122 (see FIGS. 6a and 6b) in addition to or instead of in between each alignment hole 122 and the fiber array 106 in order to make the pin clamp 110 more robust.

Figure 7:
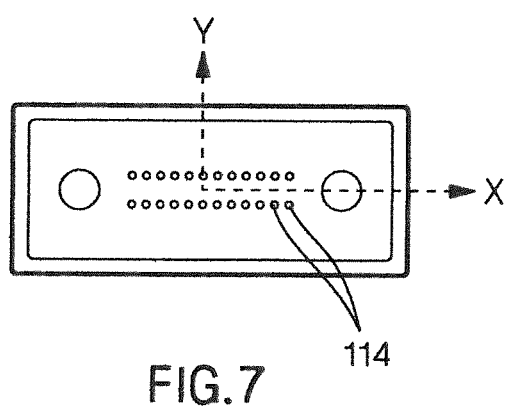
FIG. 7 is a front view of the connector of FIG. 1.

The next popular fiber count after 12 is 24, which employs two rows of 12 fibers each. FIG. 7 shows a front connector face for a 24 count MPO connector. As a result of the fiber layout, it is important to concentrate the spring force directly to the fiber tip region without biasing one row or column over another. Current MPO connectors often have a problem in which one row or quadrant of the fibers would perform well while the other row or quadrants would not.

Figure 9:
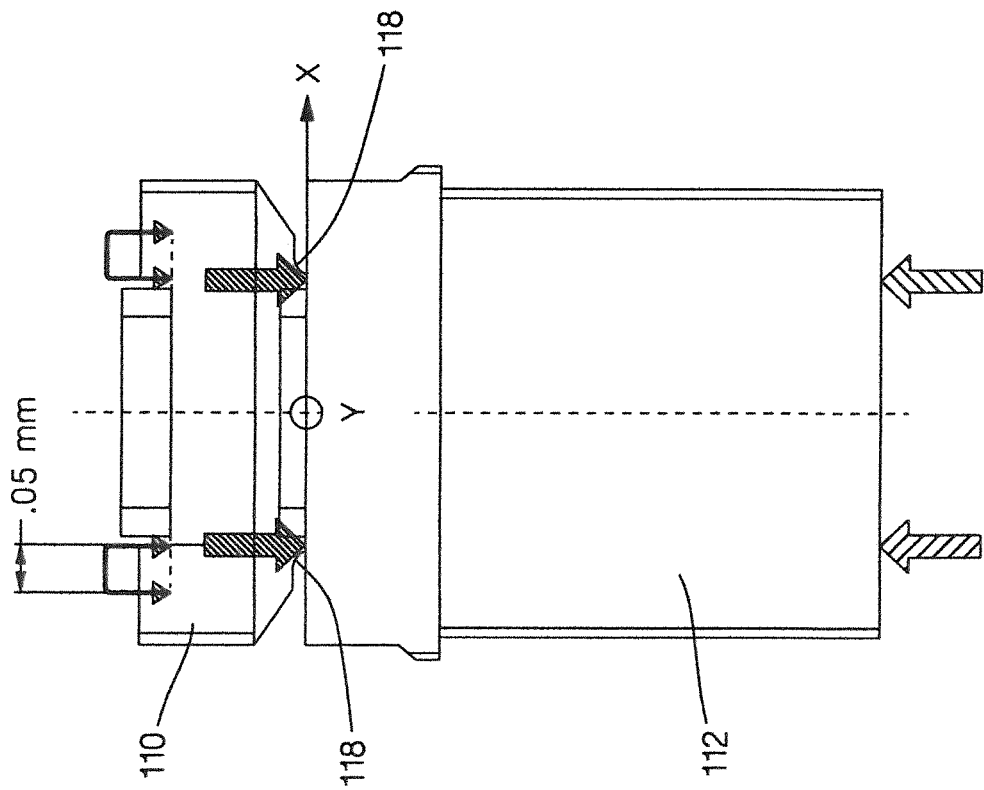
FIG. 9 is a top view of the pin clamp and ferrule of the internal assembly for the connector of FIG. 1, highlighting the reduced offset in the x-direction.
Figure 8:
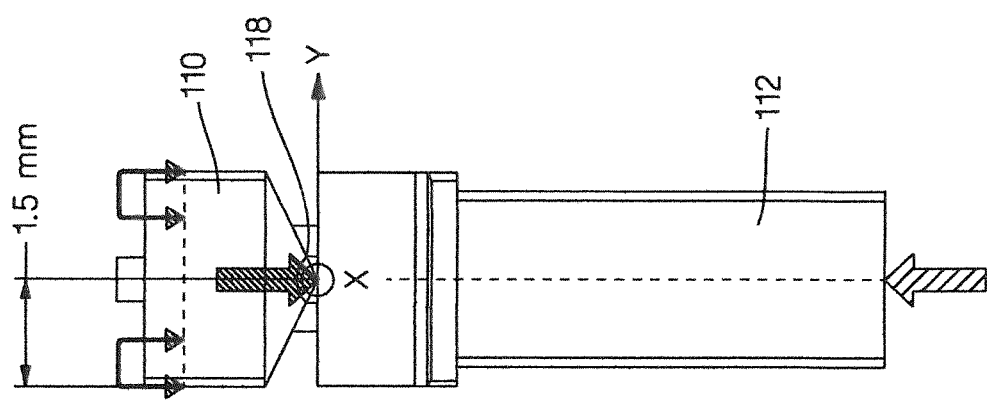
FIG. 8 is a side view of the pin clamp and ferrule of the internal assembly of the connector of FIG. 1, highlighting the reduced offset force in the y-direction.
Figure 10:
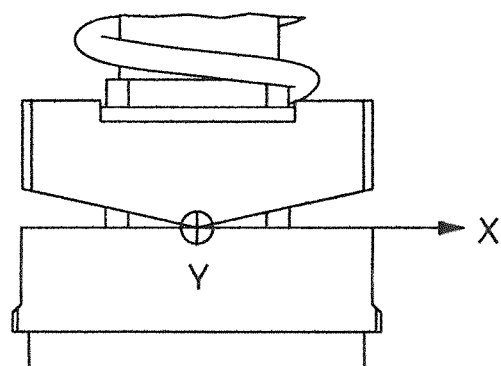
FIG. 10 is a top view of the internal assembly of a first alternate embodiment of an MPO type connector with reduced offset loading, focusing on the pin clamp.
Figure 11:
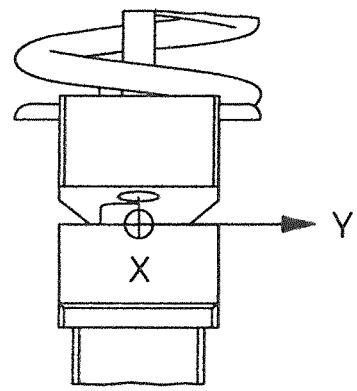
FIG. 11 is a side view of the internal assembly of FIG. 10.
Figure 12:
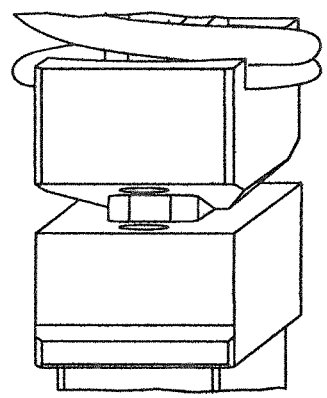
FIG. 12 is a perspective view of the internal assembly of FIG. 10.

FIGS. 8 and 9 show how the force created by the spring 104 is centered on the ferrule 112 by the pin clamp 110, resulting in reaction forces on the front of the ferrule 112 where the fiber tips 114 are located. The location of the offset force in the y-direction is significantly reduced, in some embodiments, by as much as 1.5 mm from both the top and bottom for a standard 24 count MPO connector. In some embodiments, the offset in the x-direction is also reduced by approximately 0.5 mm from each side. The reduction in the offset in the y-direction reduces any moments applied about the x-axis, which improves the fiber contact between rows. The reduction of offset in the x direction reduces moments applied about the y-axis, which improves the fiber contact between quadrants. The objective is to minimize the moment created along the x and y centerlines of the ferrule.

FIGS. 10-14 show a first alternate embodiment of a connector with reduced off-center loading in which the contact surfaces 118 are instead located along the mid-point of the width of the ferrule 112 (in FIGS. 10-14, the contact points are along the y-axis, the y-axis being the direction of the height of the ferrule and the x-axis being in the direction of the width of the ferrule) and on either side of the fiber array 106, as close to the centerline of the height (as close to the x-axis) as allowed by the size of the fiber array 106.

Figure 14:
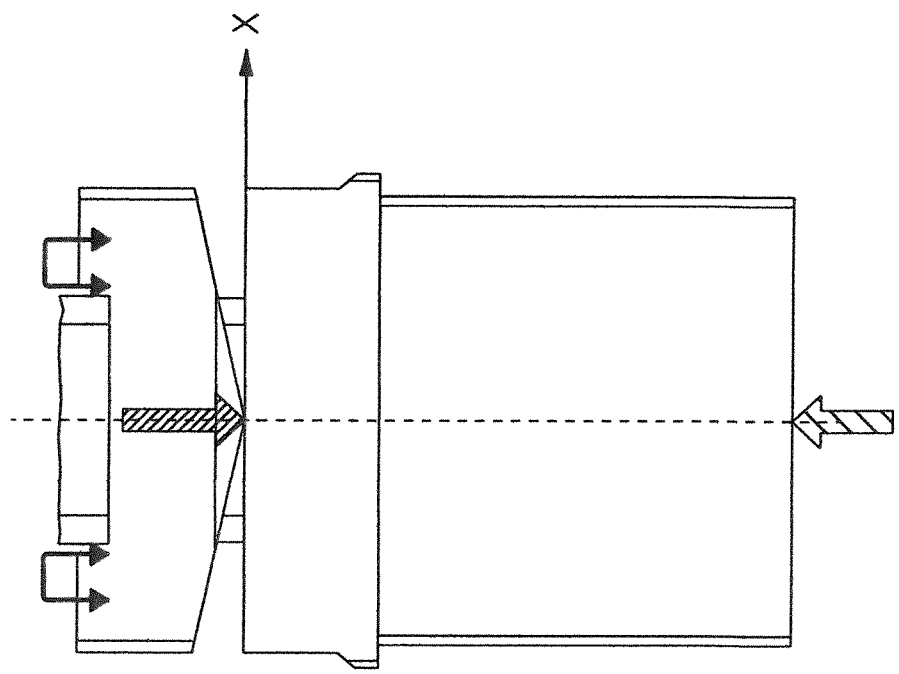
FIG. 14 is a top view of the pin clamp and ferrule of the internal assembly of FIG. 10, highlighting the reduced offset force in the x-direction.
Figure 13:
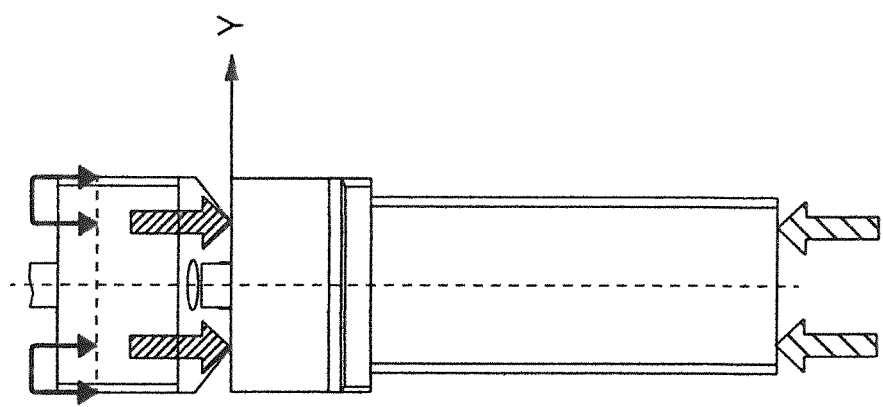
FIG. 13 is a side view of the pin clamp and ferrule of the internal assembly of FIG. 10, highlighting the reduced offset force in the y-direction.

FIGS. 13 and 14 show how the offset force in the x-direction is significantly reduced, as much as by 2.4 mm from both sides for a standard 24 count MPO connector. The offset in the y-direction is also reduced by approximately 0.6 mm from both the top and bottom.

Figure 15A:
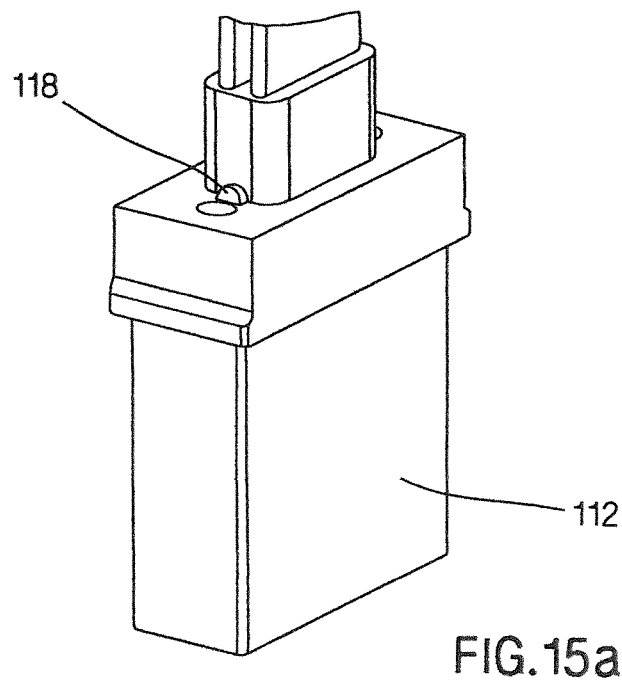
FIGS. 15a and 15b are perspective views of a ferrule and fiber array of a second alternate embodiment of an MPO connector with reduced offset loading.
Figure 15B:
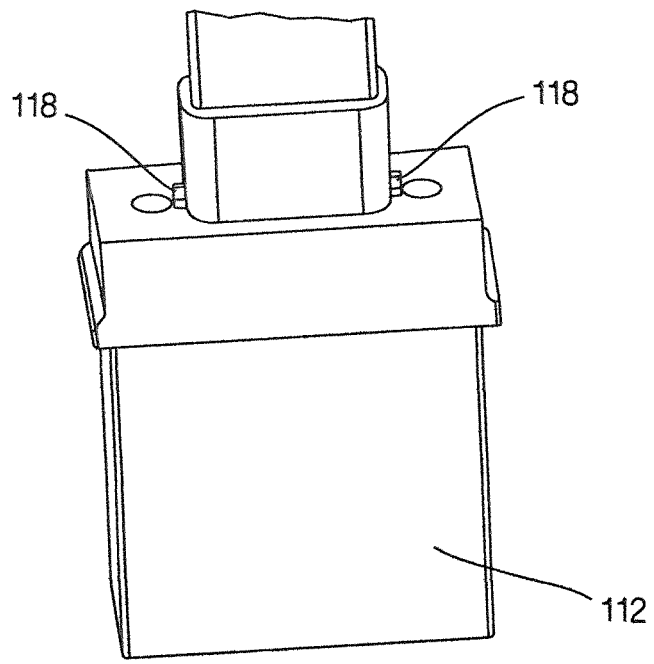
Figure 16:
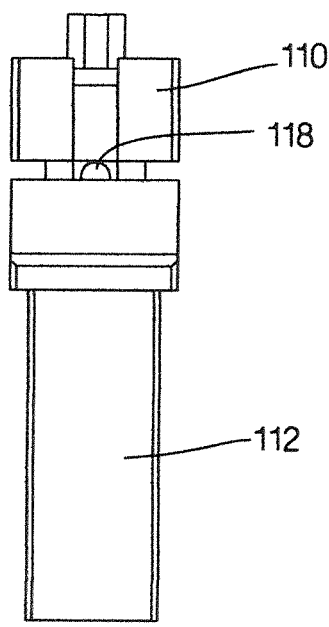
FIG. 16 is a side view of the pin clamp, ferrule, and fiber array of the embodiment of FIGS. 15a and 15b.
Figure 17:
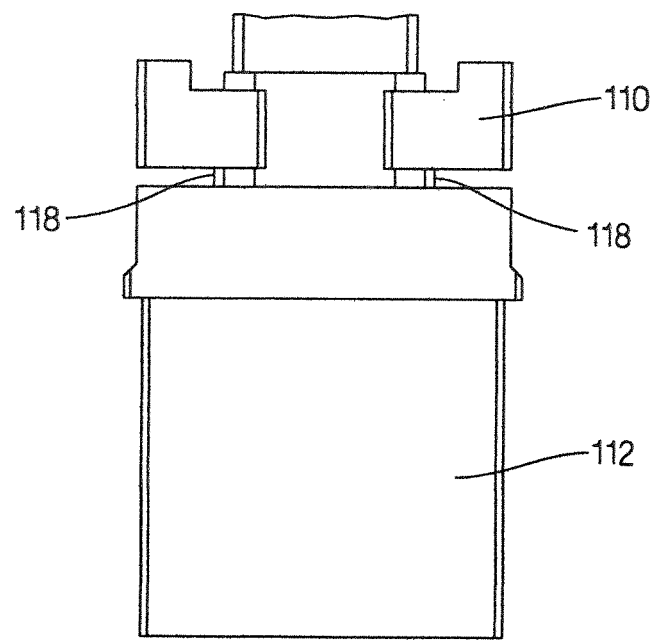
FIG. 17 is a top view of the pin clamp, ferrule, and fiber array of the embodiment of FIGS. 15a and 15b.

FIGS. 15-17 show a second alternate embodiment in which the raised surfaces 118 can be located on the ferrule 112 instead of the pin clamp 110.

FIGS. 18 and 19 show an embodiment of an internal assembly 200 that includes a retractable pin assembly similar to the one describes in U.S. patent application Ser. No. 12/909,974, which is herein incorporated by reference in its entirety. This embodiment has an internal assembly 200 with a modified pin clamp 210, which houses tabs 242 connected to alignment pins 248. The tabs 242 and alignment pins 248 can be moved axially forward and backward relative to the rest of the internal assembly 200, allowing the connector to have either a male or female configuration. The tabs 242 can have flexible legs 244 that can combine with gaps 246 to allow the alignment pins to move radially relative to the pin clamp 210 (yet remain stationary relative to the ferrule 112) in order to help reduce off-center loading.

While particular embodiments and applications of the present invention have been illustrated and described, it is to be understood that the invention is not limited to the precise construction and compositions disclosed herein and that various modifications, changes, and variations may be apparent from the foregoing without departing from the spirit and scope of the invention as described.

The invention claimed is:

1. An internal assembly for a fiber optic connector comprising:
   a ferrule;
   a fiber array attached to the ferrule;
   a pin clamp, the pin clamp having a pair of raised contact surfaces abutting a rear face of the ferrule proximate to a centerline of a height of the ferrule and on opposite sides of and proximate to the fiber array such that a distance between the fiber array and the raised contact surfaces is less than a distance between the fiber array and an outer edge of the pin clamp; and
   a spring, the spring configured to apply a force to the pin clamp in order to abut the pin clamp to the ferrule.

2. The internal assembly of claim 1 further comprising a spring push wherein a first end of the spring is in contact with the pin clamp and a second end of the spring is in contact with the spring push.

3. The internal assembly of claim 1 wherein the pin clamp further comprises a spring clamp pocket, the spring configured to sit in the spring clamp pocket.

4. The internal assembly of claim 1 wherein the ferrule further comprises alignment holes on opposite sides of the fiber array, the raised contact surfaces being located proximate to the centerline of the height, on opposite sides of the fiber array, and outside of the alignment holes.

5. The internal assembly of claim 1 wherein the spring clamp further comprises a retractable pin assembly.

6. An internal assembly for a fiber optic connector comprising:
   a ferrule;
   a fiber array attached to the ferrule;
   a pin clamp, the pin clamp having a pair of raised contact surfaces abutting a rear face of the ferrule proximate to a centerline of a width of the ferrule and on opposite sides of and proximate to the fiber array such that a distance between the fiber array and the raised contact surfaces is less than a distance between the fiber array and an outer edge of the pin clamp; and
   a spring, the spring configured to apply a force to the pin clamp in order to abut the pin clamp to the ferrule.

7. The internal assembly of claim 6 further comprising a spring push wherein a first end of the spring is in contact with the pin clamp and a second end of the spring is in contact with the spring push.

8. The internal assembly of claim 6 wherein the pin clamp further comprises a spring clamp pocket, the spring configured to sit in the spring clamp pocket.

9. The internal assembly of claim 6 wherein the spring clamp further comprises a retractable pin assembly.

10. An internal assembly for a fiber optic connector comprising:
    a pin clamp;
    a ferrule;
    a fiber array attached to the ferrule, wherein the ferrule has a pair of raised contact surfaces proximate to a centerline of a height of the ferrule and on opposite sides of and proximate to the fiber array abutting the pin clamp such that a distance between the fiber array and the raised contact surfaces is less than a distance between the fiber array and an outer edge of the pin clamp; and
    a spring, the spring configured to apply a force to the pin clamp in order to abut the pin clamp to the ferrule.

11. The internal assembly of claim 10 further comprising a spring push wherein a first end of the spring is in contact with the pin clamp and a second end of the spring is in contact with the spring push.

12. The internal assembly of claim 10 wherein the pin clamp further comprises a spring clamp pocket, the spring configured to sit in the spring clamp pocket.

13. The internal assembly of claim 10 wherein the spring clamp further comprises a retractable pin assembly.

* * * * *